US012605229B1

(12) United States Patent
Alshamrani

(10) Patent No.: US 12,605,229 B1
(45) Date of Patent: Apr. 21, 2026

(54) DENTAL APPARATUS INCLUDING A PROP AND A RUBBER DAM AND A METHOD OF USING THE SAME

(71) Applicant: KING SAUD UNIVERSITY, Riyadh (SA)

(72) Inventor: Mohammed Hazaa Alshamrani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/265,579

(22) Filed: Jul. 10, 2025

(51) Int. Cl.
*A61C 5/00* (2017.01)
*A61C 5/82* (2017.01)

(52) U.S. Cl.
CPC ............... *A61C 5/007* (2013.01); *A61C 5/82* (2017.02)

(58) Field of Classification Search
CPC .. A61C 5/007; A61C 5/82; A61C 5/80; A61C 5/90; A61C 5/85; A61C 5/77; A61C 5/20; A61C 5/00; A61C 5/35; A61C 5/62; A61C 5/30; A61C 5/70; A61C 5/146; A61C 13/0004; A61C 13/0001; A61C 13/0006; A61C 13/0022; A61C 13/081; A61C 13/20; A61C 13/09; A61C 13/34; A61C 13/00; A61C 17/08; A61C 17/10; A61C 17/00; A61C 17/024; A61C 17/06; A61C 17/02; A61C 19/066; A61C 19/004; A61C 19/063; A61C 19/06; A61C 19/05; A61C 19/00; A61C 19/001; A61C 19/04; A61C 19/052; A61C 9/0033; A61C 9/00; A61C 9/0006; A61C 9/002; A61C 9/004; A61C 9/0046; A61C 9/0053; A61C 1/088; A61C 1/082; A61C 11/02; A61C 11/003; A61C 11/006; A61C 2201/002; A61C 2201/00; A61C 2203/00; A61C 7/08; A61C 8/0036; A61C 13/0003; A61C 13/0019
USPC ........................................................ 433/215
See application file for complete search history.

(56) References Cited

U.S. PATENT DOCUMENTS

| | | | |
|---|---|---|---|
| 4,828,491 A | 5/1989 | Gray | |
| 5,078,604 A | 1/1992 | Malmin | |
| 5,727,944 A | 3/1998 | White | |
| 5,803,734 A | 9/1998 | Knutson | |
| 6,309,218 B1 | 10/2001 | Ellenbecker | |
| 7,331,788 B2 | 2/2008 | Kilcher et al. | |
| 12,004,917 B1 * | 6/2024 | Shivappa ................. | A61C 5/90 |
| 2004/0219486 A1 | 11/2004 | Heasley | |

(Continued)

*Primary Examiner* — Eric J Rosen
*Assistant Examiner* — Mirayda A Aponte
(74) *Attorney, Agent, or Firm* — Nath, Goldberg & Meyer; Joshua B. Goldberg

(57) ABSTRACT

A dental apparatus includes a body made of a first elastomeric material; and a reinforcing member made of a stiffer, second elastomeric material, and a rubber dam covering a through opening in a base of the body. The body of the dental apparatus includes the base, a first plurality of sidewalls protruding from a first side surface of the base and a second plurality of sidewalls protruding from the second side surface of the base, opposite to the first plurality of sidewalls. The plurality of sidewalls includes a posterior sidewall that can be used as a mouth prop. The base includes a groove to direct fluid away from base and away from the rubber dam. The second plurality of sidewalls include a pair of sidewalls that align the dental apparatus on a row of teeth.

20 Claims, 12 Drawing Sheets

(56) References Cited

U.S. PATENT DOCUMENTS

| | | |
|---|---|---|
| 2007/0231773 A1 | 10/2007 | Pontynen et al. |
| 2008/0289638 A1 | 11/2008 | Peters et al. |
| 2010/0233652 A1 | 9/2010 | Cofre Gaete |
| 2011/0217672 A1 | 9/2011 | Wallace |
| 2017/0367790 A1 | 12/2017 | Heymann et al. |
| 2022/0133436 A1 | 5/2022 | Thoreson |

* cited by examiner

2000

DENTAL APPARATUS INCLUDING A PROP AND A RUBBER DAM AND A METHOD OF USING THE SAME

TECHNICAL FIELD

The present disclosure relates to a dental apparatus, and more particularly, to a dental apparatus that includes a mouth prop and a rubber dam and a method of using the same.

DISCUSSION OF THE RELATED ART

In dentistry, a mouth prop is used to assist a dental patient in keeping their mouth open such that a dental professional can proceed with performing a dental procedure. A mouth prop typically has a block (or brick-like) shape and is made of a flexible elastomeric material. The dental prop is commonly placed between the teeth of the upper jaw and the teeth of the lower jaw to keep the patient's mouth open during a dental procedure.

A dam (or a rubber dam, as it is typically referred to in dentistry) is a flexible sheet of material that is placed in the patient's mouth during certain dental procedures to expose the tooth being worked on while covering the other teeth. The purpose of the rubber dam is to keep a hygienic environment in the patient's mouth during a dental procedure. This is achieved by the dam preventing or at least restricting saliva and other contaminants located in the mouth from entering the tooth being worked on, and preventing or at least restricting contaminants from the tooth being worked on (e.g., decayed tooth material, etc.,) from coming in contact with saliva or other parts of the patient's mouth.

A rubber dam typically requires use of a frame to keep the rubber dam stretched during a dental procedure.

A mouth prop and a dam are most commonly separately placed in a patient's mouth and separately removed at the end of a dental procedure.

SUMMARY

The present disclosure relates to a dental device and a method of using the same in dental patients. The dental device of the present subject matter combines a mouth prop and a rubber dam in a single, integral device, thereby reducing complications that may arise from coordinating the placement and removal of a separate prop and a separate rubber dam in a patient's mouth.

The dental apparatus of the present subject matter simplifies dental procedures in dental patients in general, and particularly in children, who tend to have a higher rate of noncompliance with the dentist's instructions than adults. However, the dental apparatus of the present disclosure can also be used in adults and seniors to simplify certain dental procedures, such as fillings, root canals, etc.

The dental device of the present subject matter has a body made of a flexible elastomeric material. In certain embodiments, the body has a base intended to be placed over (or under) a row of teeth. The base has a through opening, and the through opening is covered by an elastic sheet of material, for example, a material suitable for forming a rubber dam. Therefore, the base of the body of the dental device can be used as a rubber dam that covers a number of teeth along a jaw of the patient.

The back side of the body includes a sidewall that protrudes from the base. The protruding sidewall can serve as a mouth prop, intended to be bitten by the teeth of the upper jaw and the teeth of the lower jaw to keep the patient's mouth open during a dental procedure. The sidewall at the back side of the body can feature a through opening, and said through opening can be used for tying dental floss or other string to the dental apparatus for safety purposes. For example, when a patient inadvertently dislodges the dental apparatus and the dental apparatus is moved to the back of the patient's mouth, potentially posing a choking risk, the floss can be used to pull the dental apparatus away from the back of the patient's mouth towards the opening of the patient's mouth.

A groove can be formed around the through opening of the base to collect fluid that may accumulate on the base of the dental apparatus during a dental procedure. The groove can be used to enable the collected fluid to drain at the front of the dental apparatus (e.g., to drain at the lingual side).

A reinforcing member that is stiffer than the flexible material used to form the base can be embedded (or disposed) inside the base to increase the rigidity of the dental apparatus as a whole. This way, the dental apparatus as a whole is neither too flexible (or soft) to maintain its shape while being used in a patient's mouth nor too rigid to provide discomfort to the patient.

The bottom side of the body includes two sidewalls that are configured to align the dental apparatus along the row of teeth which includes the tooth being worked on and assist with maintaining the dental apparatus stable on said row of teeth during a dental procedure.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
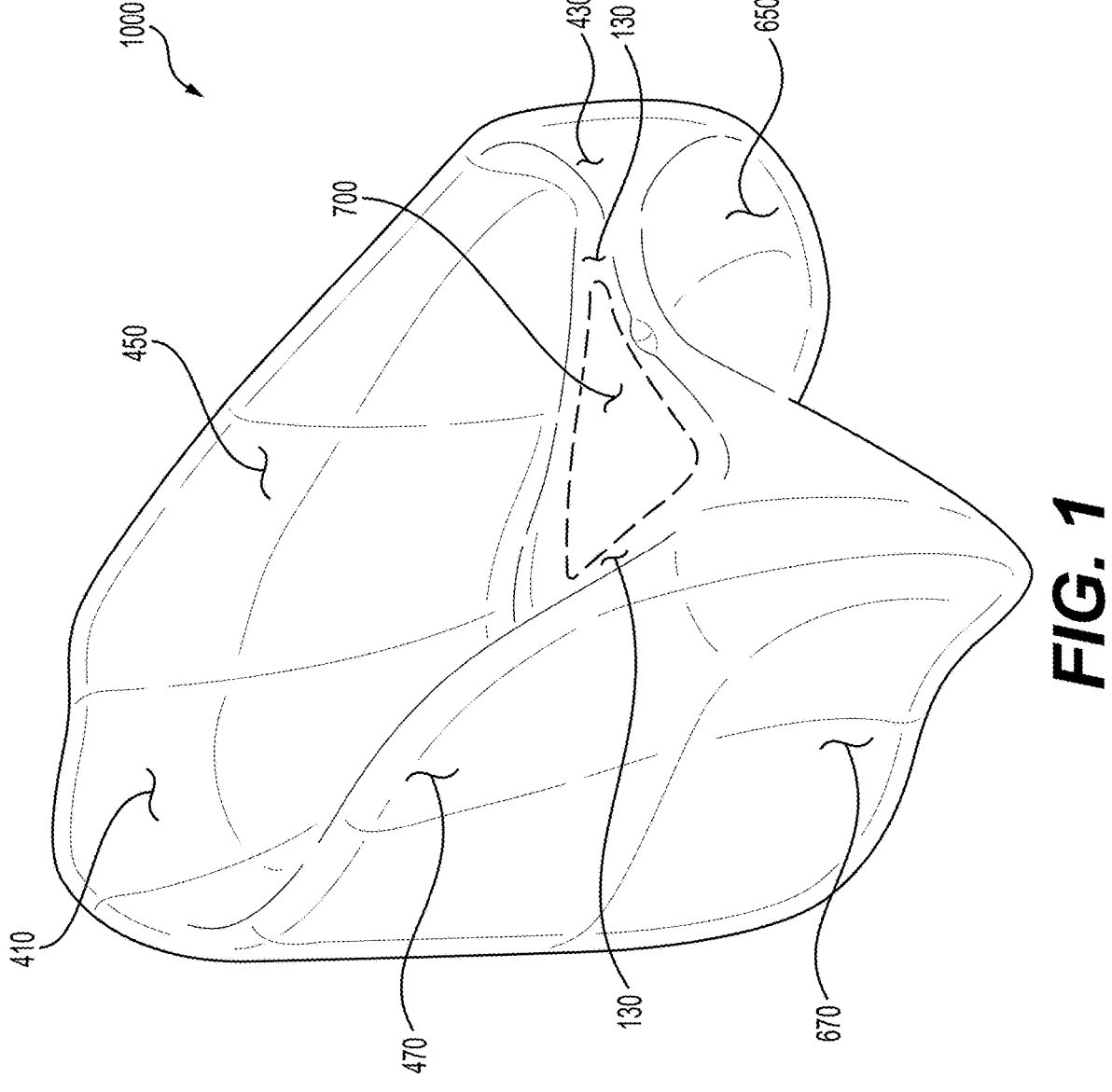
FIG. 1 is a first perspective view illustrating a dental apparatus of the present subject matter.
Figure 2:
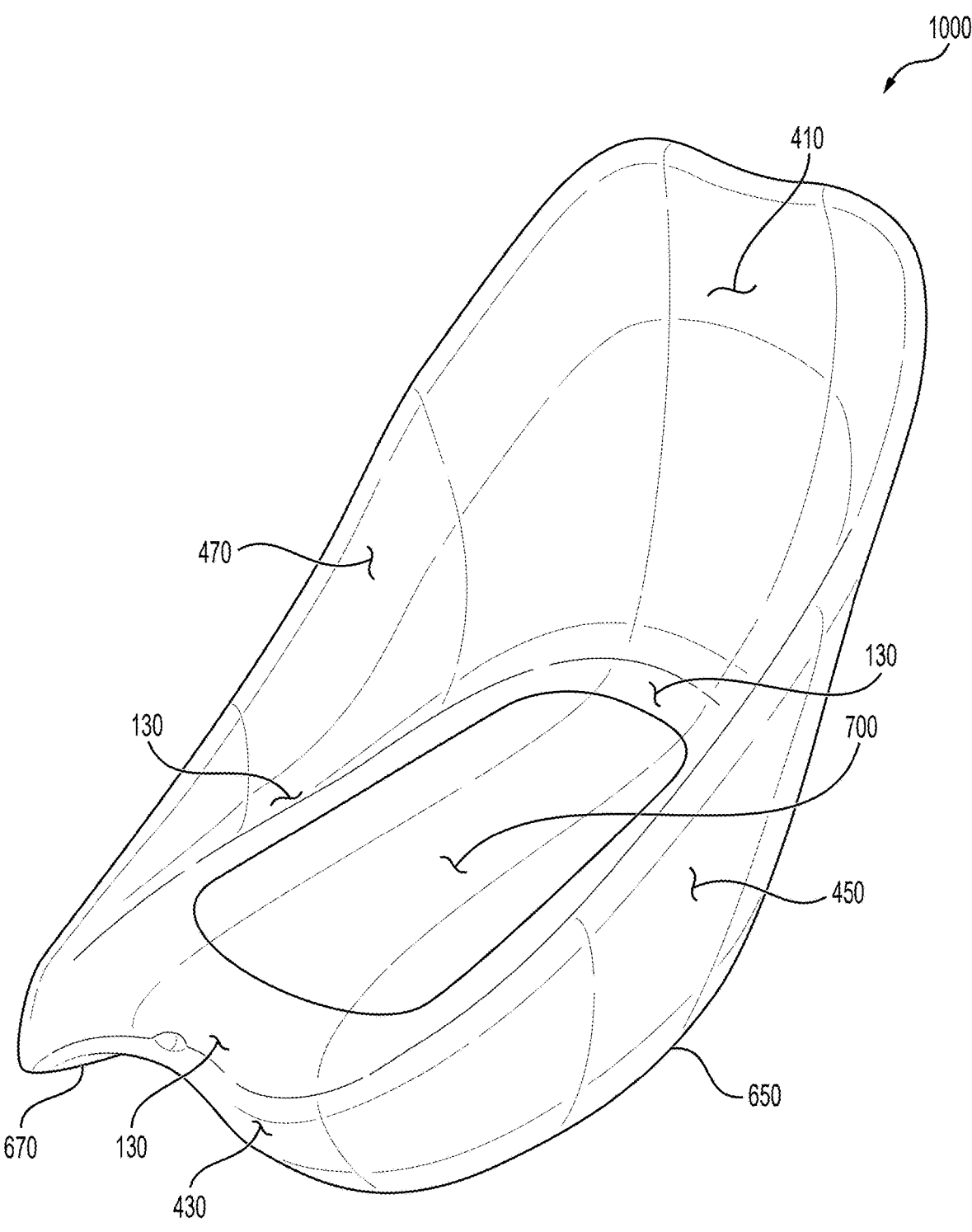
FIG. 2 is a second perspective view illustrating the dental apparatus of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Referring to FIGS. 1-10, a dental apparatus 1000 in accordance with the present subject matter includes a body 100 made of a first elastomeric material, a reinforcing member 300 disposed at least partially inside of the body 100, and a dam 700 connected to a base 110 of the body 100.

The first elastomeric material of the body 100 may include silicone. In a non-limiting approach, the first elastomeric material includes solely silicone.

The reinforcing member 300 is made of a second elastomeric material. The second elastomeric material should have a higher modulus of elasticity than the first elastomeric material of the body 100. Stated otherwise, the second elastomeric material should be stiffer than the first elastomeric material. The second elastomeric material of the reinforcing member 300 may include polypropylene. In a non-limiting approach, the second elastomeric material includes solely polypropylene.

By virtue of having a higher modulus of elasticity than the first elastomeric material, the reinforcing member 300 structurally reinforces (e.g., stiffens) the body 100 such that the dental apparatus 1000 as a whole can withstand a patient's biting force and/or force exerted on the dental apparatus 1000 by a dental professional's hands and/or dental instruments without deforming to a degree large enough to render the dental apparatus 1000 unusable for its intended purpose.

In addition, as illustrated in the drawings, the reinforcing member 300 may be fully embedded in the body 100, and therefore, might be prevented from coming in direct contact with a patient's mouth. As such, the comparatively softer (or more elastic) body 100, which is intended to come in direct contact with the mouth of a patient (e.g., to be placed between the teeth of the upper jaw and the teeth of the lower jaw) can provide a more comfortable experience in a user's mouth due to its flexibility (e.g., due to the softness or flexibility of the first elastomeric material, e.g., silicone, having a lower modulus of elasticity than the second elastomeric material).

Figure 5:
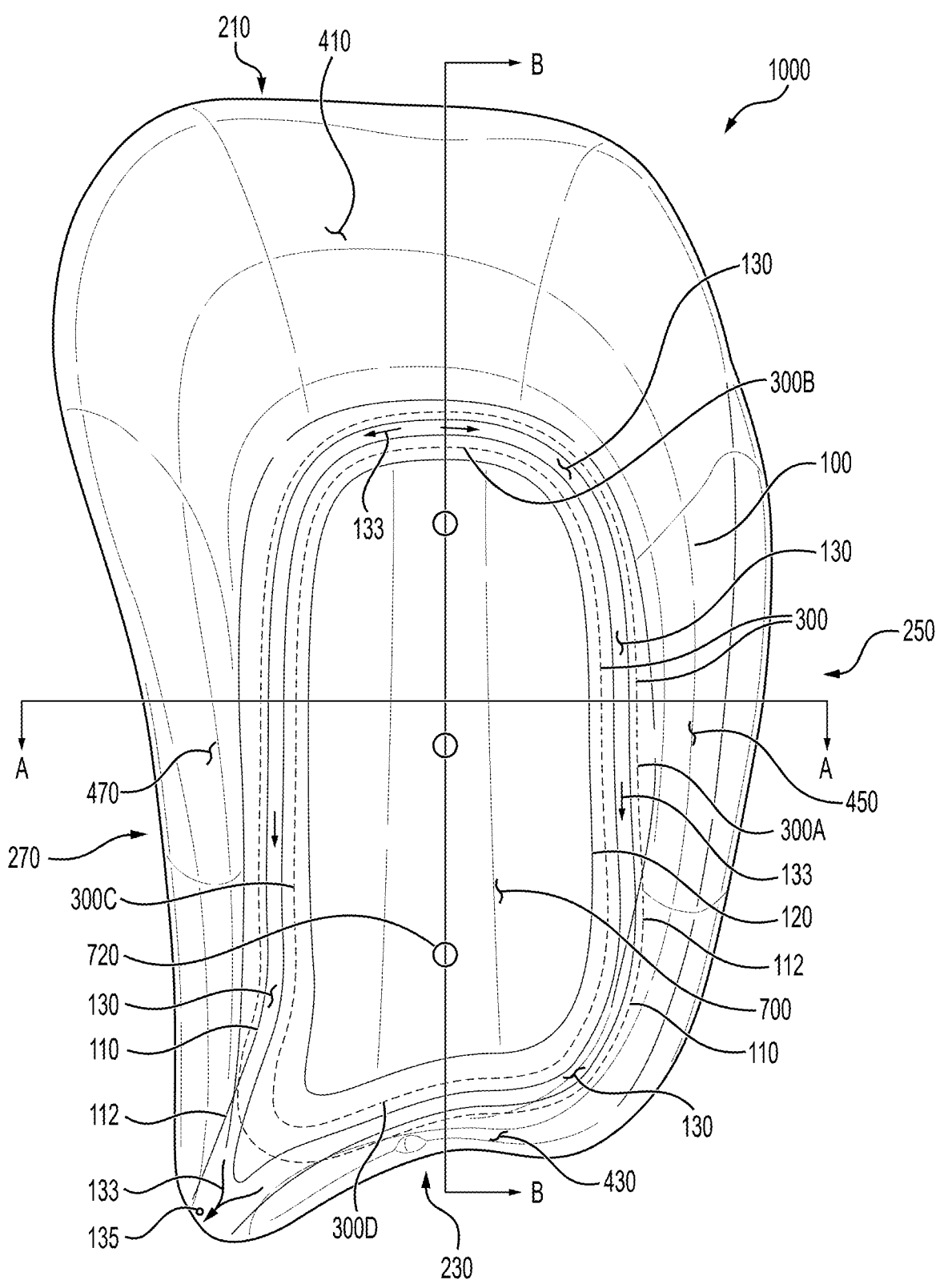
FIG. 5 is a top view illustrating the dental apparatus of FIG. 1.
Figure 6:
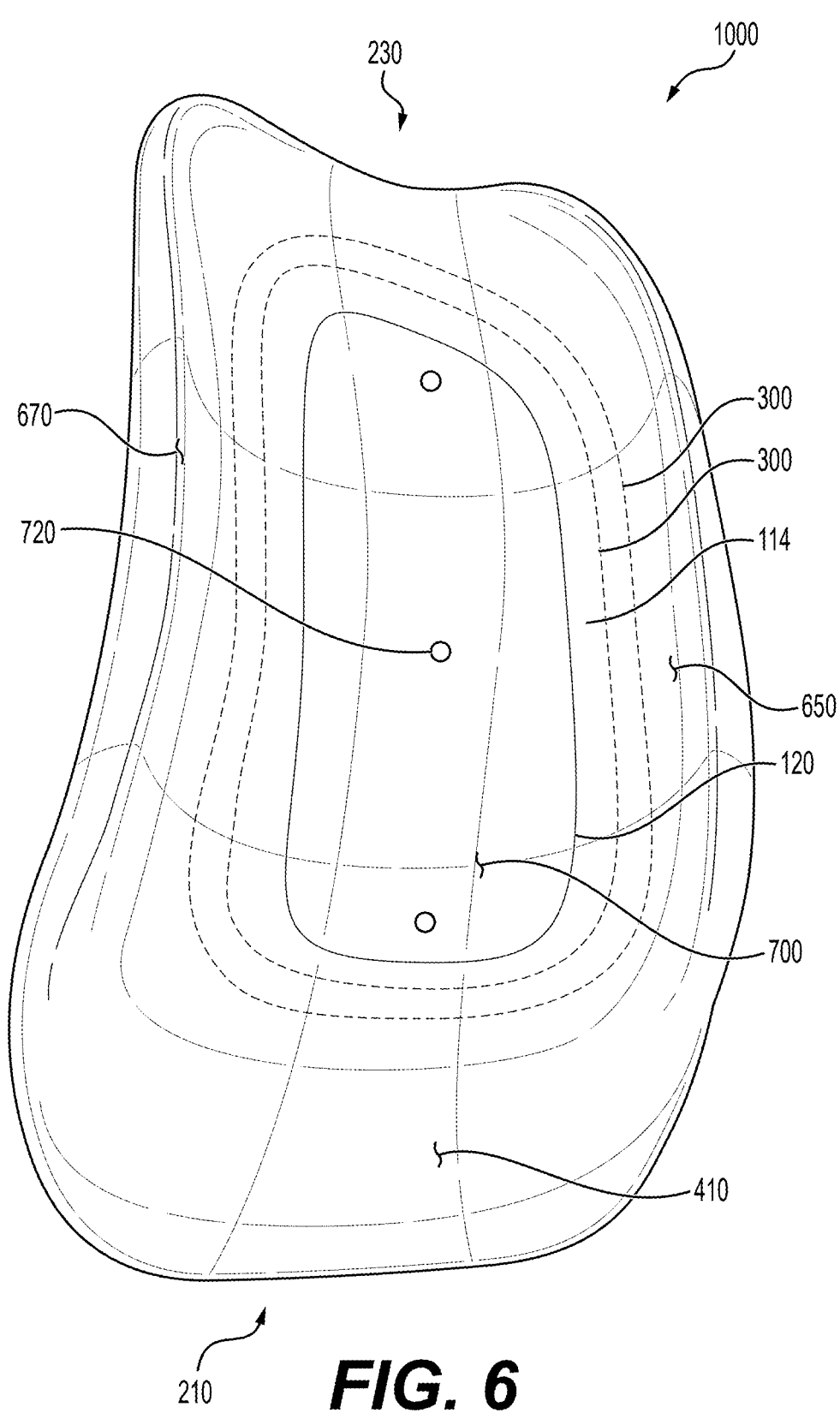
FIG. 6 is a bottom view illustrating the dental apparatus of FIG. 1.
Figure 9:
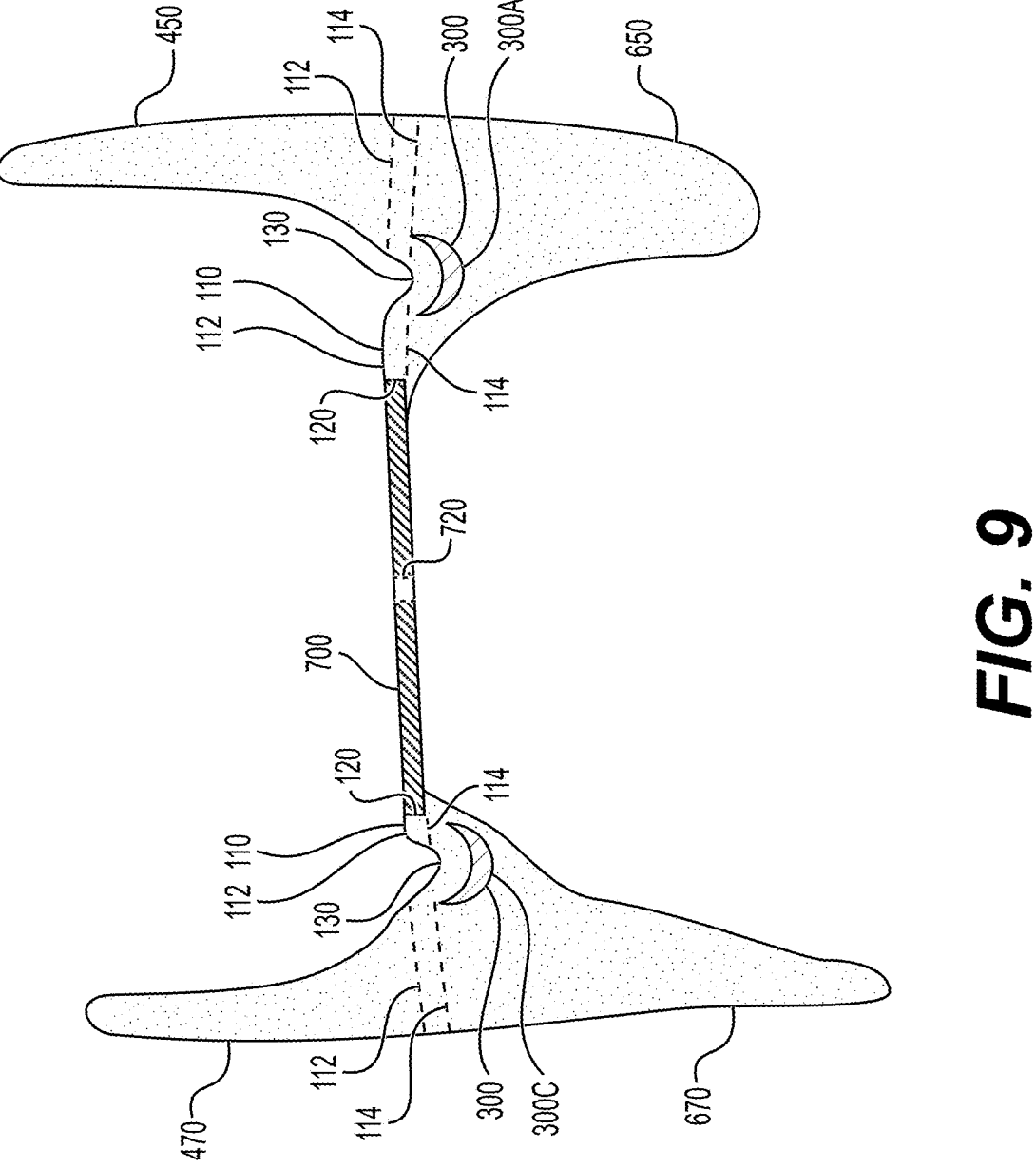
FIG. 9 is a cross-sectional view taken along line A-A of FIG. 5.
Figure 10:
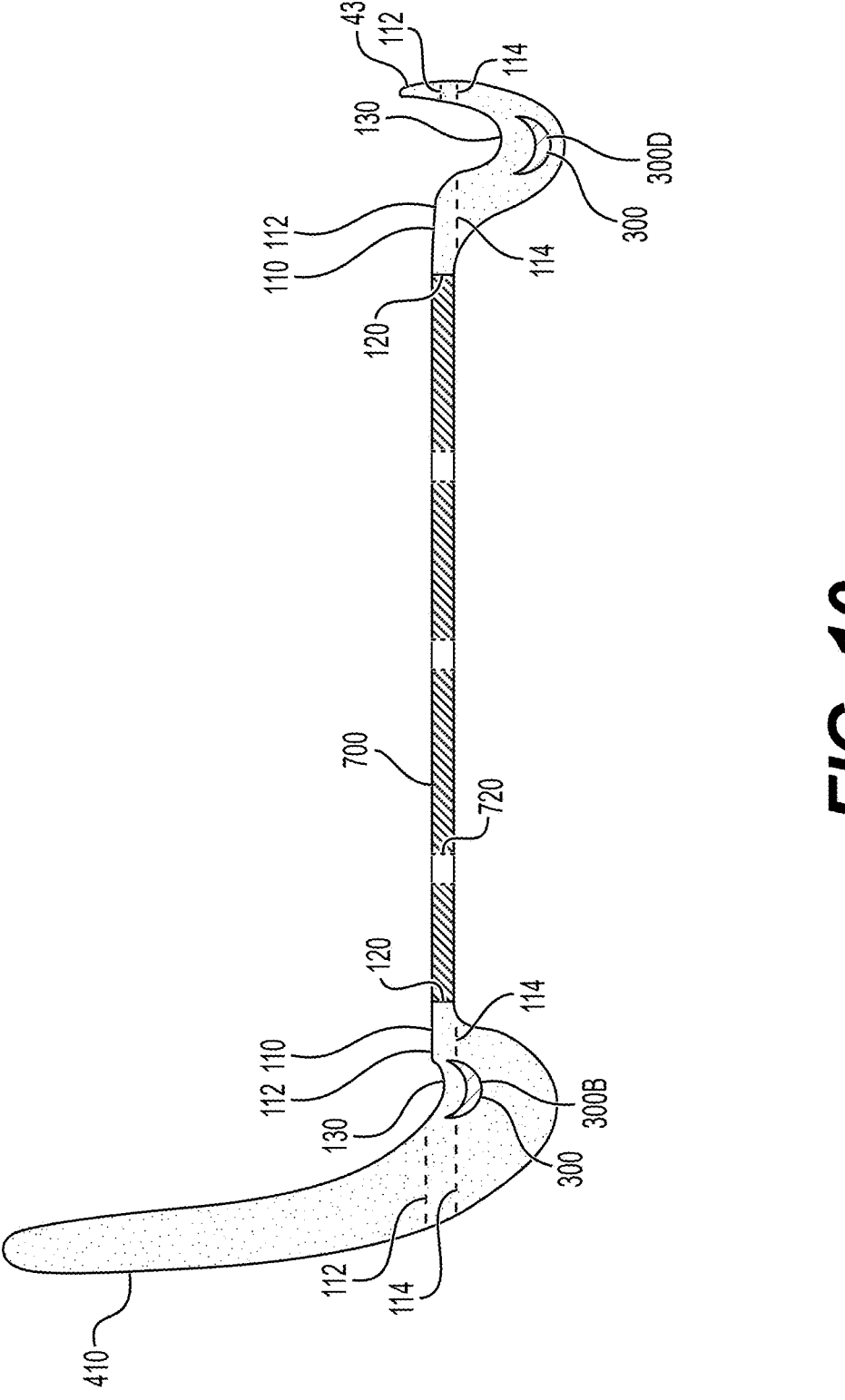
FIG. 10 is a cross-sectional view taken along line B-B of FIG. 5.

Referring to FIGS. 5, 9 and 10, the body 100 of the dental apparatus 1000 includes a base 110 having a first side surface 112 (e.g., a top side surface) and a second side surface 114 (e.g., a bottom side surface) opposite to the first side surface 112.

A periphery of the first side surface 112 and a periphery of the second side surface 114 define a posterior side 210 of the body 100 (see FIG. 5), an anterior side 230 of the body 100 (see FIG. 5), spaced apart from the posterior side 210, a buccal side 250 of the body 100 (see FIG. 5), connecting the anterior and posterior sides 210, 230 to one another, and a lingual side 270 of the body 100 (see FIG. 5), connecting the anterior and posterior sides 210, 230 to one another, the lingual side 270 being spaced apart from the buccal side 250.

Figure 7:
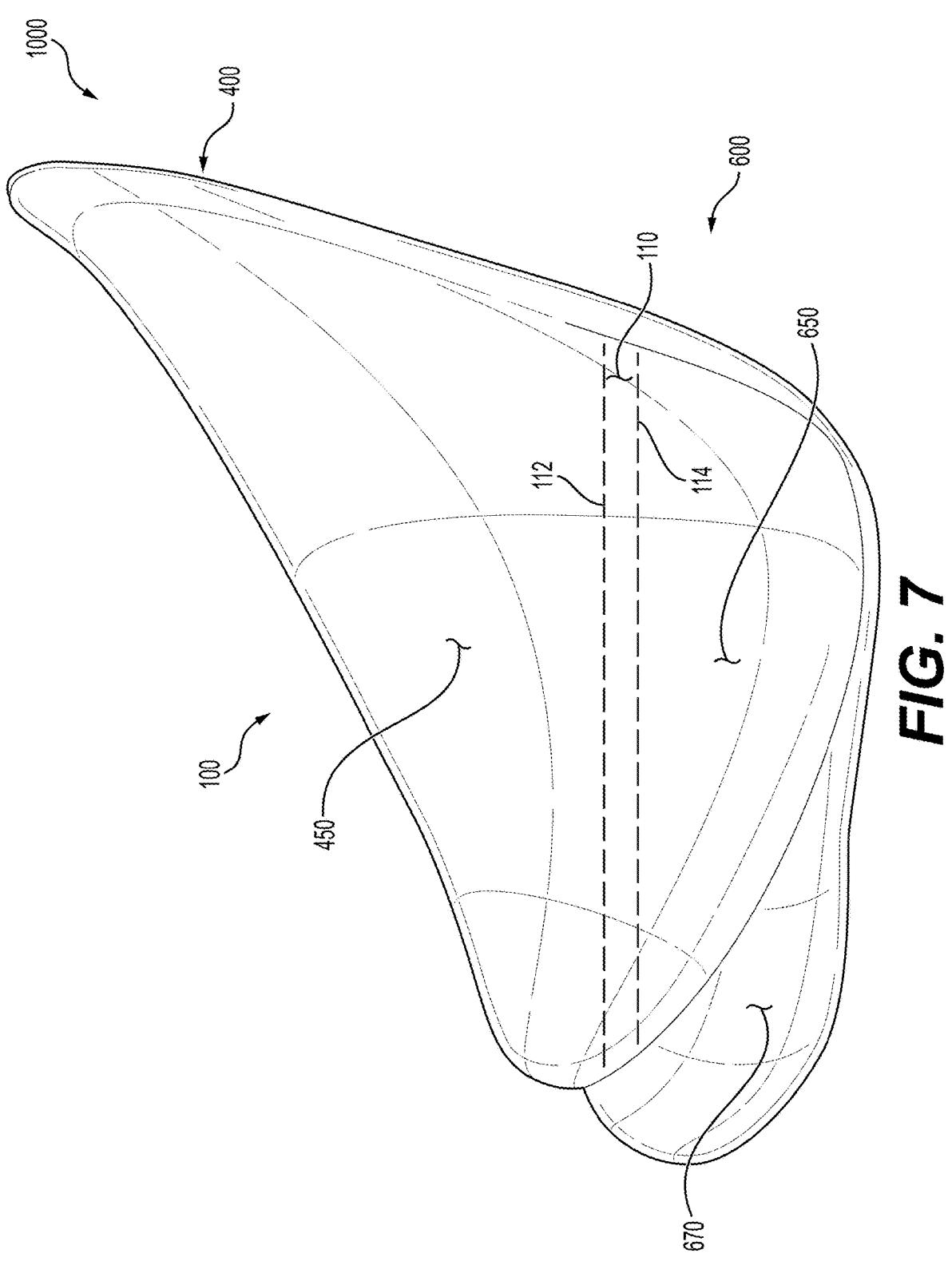
FIG. 7 is a right side view illustrating the dental apparatus of FIG. 1.

Referring to FIG. 7, the body 100 of the dental apparatus 1000 includes a first plurality of sidewalls 400 protruding from the first side surface 112 of the base 100 (e.g., protruding upwardly from the base 100, when the dental apparatus 1000 is oriented as shown in FIGS. 1-10).

Figure 8:
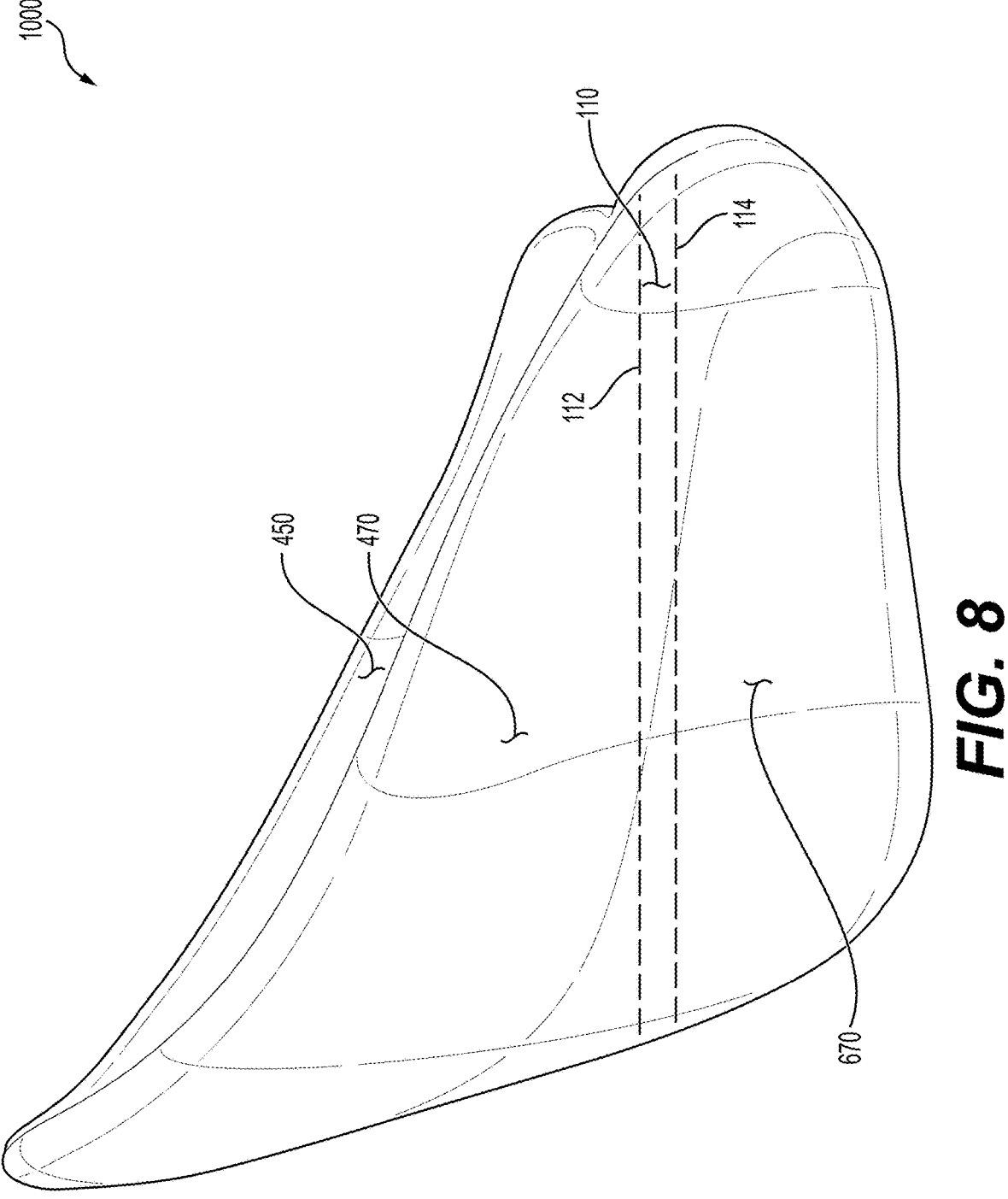
FIG. 8 is a left side view illustrating the dental apparatus of FIG. 1.

Referring to FIGS. 7-8, the body 100 of the dental apparatus 1000 also includes a second plurality of sidewalls 600, i.e., sidewalls 650 and 670 per FIG. 5, protruding from the second side surface 114 of the base 100, opposite to the direction in which first plurality of sidewalls 400, i.e., sidewalls 450 and 470 protrude. For example, the second plurality of sidewalls 600 (i.e., sidewalls 650 and 670) protrude downwardly from the second side surface 114 of the base 100 when the dental apparatus 1000 is oriented as shown in FIGS. 1-10.

Referring to FIGS. 7 and 8, the first plurality of sidewalls 400 includes:

a posterior sidewall 410 extending along the posterior side 210 of the body 100;

an anterior sidewall 430 extending along the anterior side 230 of the body 100, the anterior sidewall 430 protruding by a lesser distance from the first side surface 112 of the base 100 than the posterior sidewall 410 (i.e., the posterior sidewall 410 has a greater height than the anterior sidewall 430 relative to the first side surface 112 of the base 100);

a first buccal sidewall 450 extending along the buccal side 250 of the body 100; and a first lingual sidewall 470 extending along the lingual side 270 of the body 100.

Referring to FIGS. 1, 5, 7 and 8, the second plurality of sidewalls 600 includes:

a second buccal sidewall 650 extending along the buccal side 250 of the body 100; and a second lingual sidewall 670 extending along the lingual side 270 of the body 100.

Referring to FIGS. 5, 9 and 10, the base 110 of the body 100 includes a through opening 120. The through opening 120 connects the first and second side surfaces 112, 114 of the base 110 to one another, the through opening 120 extending between the first plurality of sidewalls 400 and between the second plurality of sidewalls 600.

Figure 3:
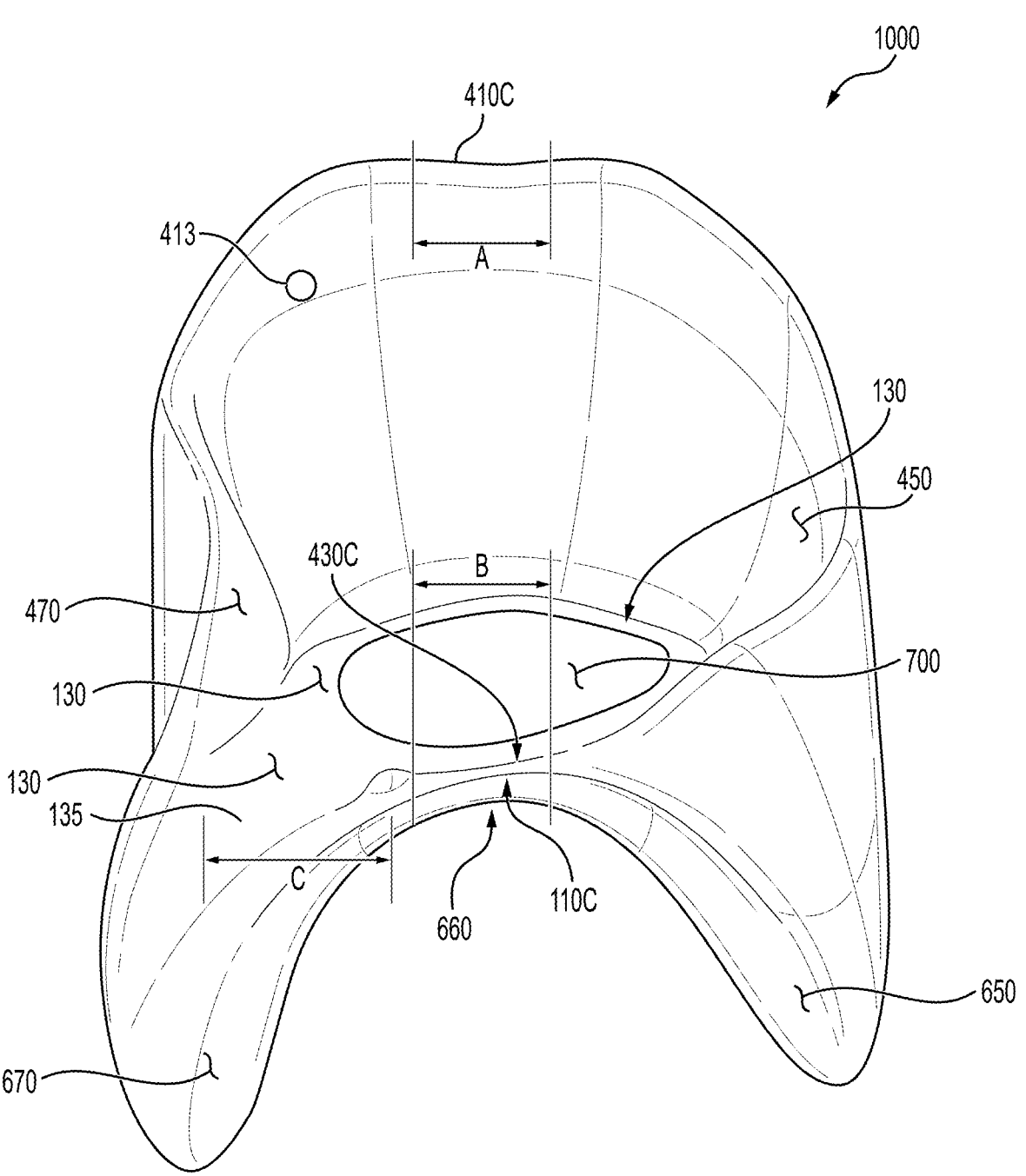
FIG. 3 is a front view illustrating the dental apparatus of FIG. 1.
Figure 4:
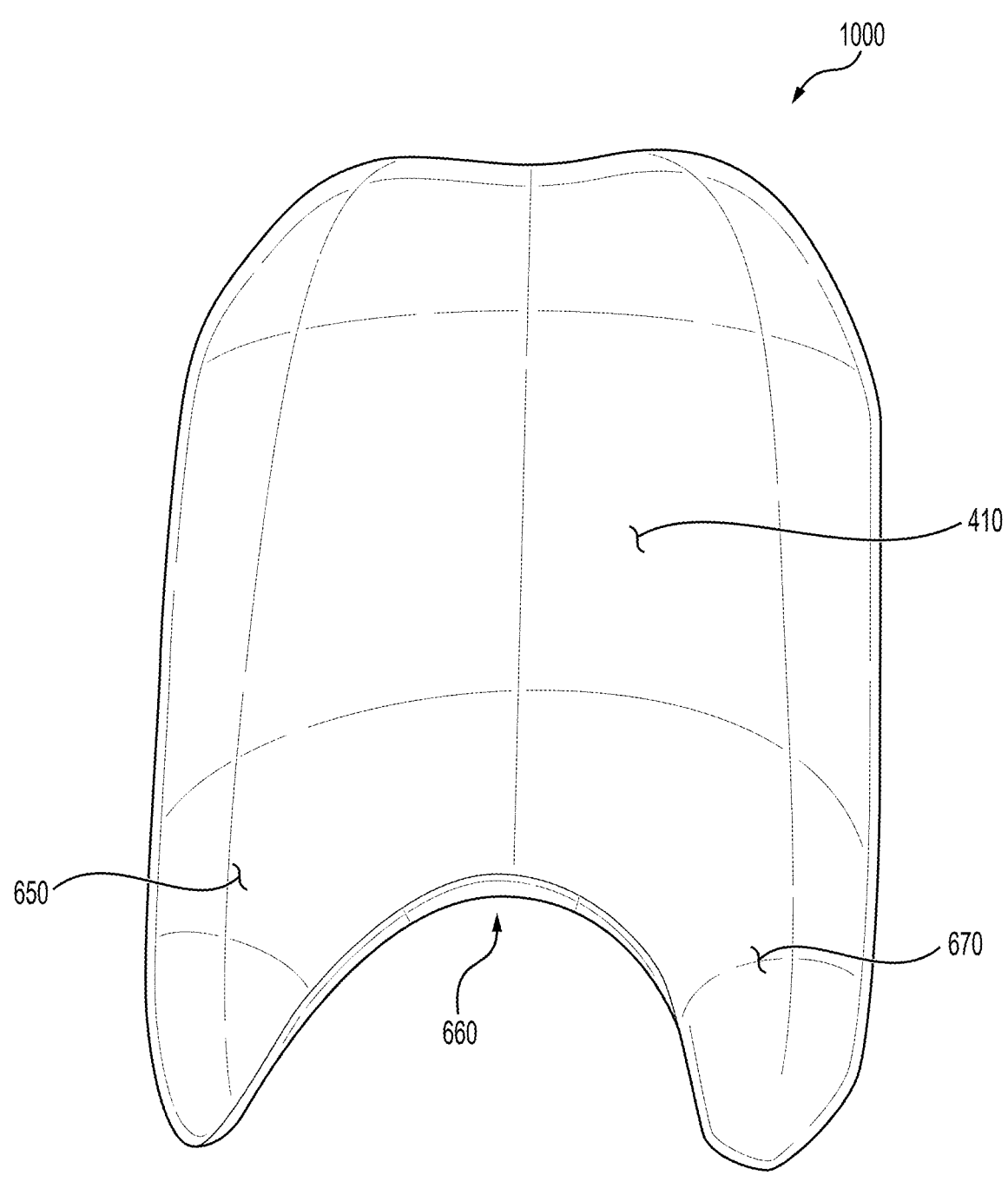
FIG. 4 is a rear view illustrating the dental apparatus of FIG. 1.

As illustrated in FIGS. 3 and 4, the second buccal sidewall 650 and the second lingual sidewall 670 form an elongated concave surface 660 between them along their respective lengths (between the posterior side 210 and the anterior side 230). The elongated concave surface 660 serves to align the body 100 along a row of teeth of a patient that include the tooth to be worked on, with the dam 700 covering (or overlapping) the tooth to be worked on.

As illustrated in FIG. 3, at least a portion of a peripheral edge 410C of the posterior sidewall 410, distal to the first side surface 112 of the base 100, may be concave. For example, as illustrated in FIG. 3, a central portion A of the peripheral edge 410C of the posterior sidewall 410 may be concave. Since the posterior sidewall 410 serves as a mouth prop, the concavity of the peripheral edge 410C can assist keeping the dental device 100 stable in place in a patient's mouth during a dental procedure since the concavity 410C is intended to be bitten by a tooth (or teeth) located in the opposite jaw to the tooth being worked on. That is, the concave peripheral edge 410C can serve to self-center the body 100 between the teeth of the upper and lower jaws when coming in contact with a patient's tooth (or teeth).

Referring to FIG. 3, at least a portion of a peripheral edge 430C of the anterior sidewall 430, distal to the first side surface 112 of the base 110, may be concave. For example, as illustrated in FIG. 3, a central portion B of the peripheral edge 430C of the anterior sidewall 430 may be concave.

Referring to FIG. 3, a peripheral edge 110C of the second side surface 114 of the base 110 (e.g., the bottom side surface of the base 110, when the dental apparatus 1000 is aligned as illustrated in FIG. 3), which defines the anterior side 230 of the body 100, may be concave. For example, as illustrated in FIG. 3, the central portion B of the peripheral edge 110C of the second side surface 114 may be concave.

The concave edge 110C of the second side surface 114 of the base 100 may be located opposite to the concave edge 430C of the anterior sidewall 430.

By making the height of the central portion B of the anterior side 230 of the body 100 low, as shown in FIG. 3 (that is, by making the height of the anterior sidewall 430 low and the thickness of the base 110 low at the central portion B), by shaping at least the central portion of the peripheral edge 430C to be concave, and by shaping at least the central portion of the peripheral edge 110C to be concave, the central front region B of the anterior side 230 of the body 100 can be used as a wedge, for example, a rubber wedge based on the specific components employed.

That is, the central front region B of the anterior side 230 of the body 110 can be inserted between two adjacent teeth (located in front of the tooth to be/being worked on), and placed on (or directly on) the gum between said two adjacent teeth, by virtue of the body 100 being made of a flexible elastomeric material and being thin at the central portion B. This configuration allows the central portion B to be slid between two adjacent teeth, down to the gum line, to be positioned on the gum similarly to a rubber wedge.

The concavity of both edges 430C, 410C of the central portion B enables the central portion B to remain comfortably and securely lodged in place between two adjacent teeth when the central portion B is disposed at the gum line between two adjacent teeth. This is because the concavity of the central portion B of the peripheral edge 430C will extend around (or "hug") a front peripheral portion one of the two adjacent teeth (when the central portion B is inserted between two adjacent teeth). The concavity of the central portion B of the peripheral edge 110C will extend around (or "hug") a rear peripheral portion of the other one of the two adjacent teeth.

The configuration of the central portion B of the anterior side 230 of the body 100, as described in this specification, can serve as a wedge, thereby eliminating the need to use a separate wedge during a dental procedure. As such, the configuration of the dental apparatus 1000 of the present subject matter reduces the number of parts used in a dental procedure.

Moreover, when the central portion B of the anterior side 230 of the body 100 is selectively slid between two adjacent teeth to reach the gum line between the neighboring teeth, the central portion B serves to securely and selectively connect the anterior side 230 of the body 100 with the teeth located in front of the tooth being worked on, thereby securely and selectively connecting the dental apparatus 1000 to a patient's teeth. The secure connection between the dental apparatus 1000 and the patient's teeth reduces the likelihood of the dental apparatus 1000 being accidentally dislodged during a dental procedure.

As can be seen with reference to FIGS. 1-2 and 7-8, the first buccal sidewall 450 may decrease in height (relative to the first side surface 112 of the base 110) in a direction toward the anterior sidewall 430.

As can be seen with reference to FIGS. 1-2 and 7-8, the first lingual sidewall 470 may decrease in height (relative to the first side surface 112 of the base 110) in a direction toward the anterior sidewall 430.

Referring to FIG. 5, the base 100 may include a groove 130 on the first side surface 112 of the base 100. The groove 130 may extend between the through opening 120 and the posterior sidewall 410, between the through opening 120 and the first buccal sidewall 450, between the through opening 120 and the first lingual sidewall 470, and between the through opening 120 and the anterior sidewall 430. In certain embodiments, the groove may be found in one or more, or all, of these locations.

A depth of the groove 130 may increase in a direction toward the anterior sidewall 430. For example, see FIG. 10, illustrating that the groove 130 may have a greater depth adjacent to the anterior sidewall 430 than adjacent to the posterior sidewall 410. The depth of the groove 130 may increase, for example, gradually (from its depth adjacent to the posterior sidewall 430) in a direction toward the anterior sidewall 430. Due to the increasing depth of the groove 130, the patient's bodily fluid (e.g., saliva) and/or fluid introduced in/on the tooth being worked on from dental personnel may be collected by the groove 130, and the increase in the depth of the groove 130 toward the anterior sidewall 430 may cause the accumulated fluid to flow by gravity along the path indicated by the arrows 133 (see FIG. 5).

With reference to FIG. 3, the anterior sidewall 430 may include a gap C. This means that the anterior sidewall 430 is discontinued (or virtually does not exist) over the gap C. The groove 130 is in fluid communication with the gap C such that fluid accumulated in the groove 130 can drain through the gap C.

For example, and with reference to FIGS. 3 and 5, a region 135 of the groove 130 indicates a region of the dental apparatus 1000 where the groove 130 drains fluid by virtue of gravity when oriented as illustrated in FIG. 3. Therefore, the groove 130 and the gap C can help prevent or at least reduce the collection of fluid on the dental apparatus 1000 during a dental procedure, thereby increasing the hygiene of the area surrounding the tooth being worked on.

The gap C in the anterior sidewall 430 may be disposed adjacent to the first lingual sidewall 470.

The posterior sidewall 410 may include a through opening 413 (see FIG. 3). The through opening 413 can be used for tying dental floss or other string material to the body 100 such that the dental apparatus 1000 can be pulled away from a patient's throat in case it becomes accidentally dislodged in the patient's mouth and is moved backwards, toward the throat (potentially posing a choking hazard). Alternatively, or in addition, any one of the other sidewalls 400 and/or 600 may be provided with a through opening for tying dental floss or string of other material thereto.

The reinforcing member 300 may include a plurality of reinforcing member components, said plurality of reinforcing member components being connected to one another and extending all around the through opening of the base As illustrated in FIG. 5, the reinforcing member 300 may include a plurality of reinforcing member components 300A, 300B, 300C, and 300D. The plurality of reinforcing member components 300A-300D are connected to one another and extend all around the through opening 120 of the base 110.

The reinforcing member components 300A-300D may be positioned to overlap the groove 130, as illustrated in FIGS. 9-10 (or be positioned under the groove 130 when the dental apparatus 1000 is oriented as illustrated in FIGS. 9-10) to prevent the groove 130 from becoming squished (or compressed to nonexistence) during a dental procedure from external forces acting on the dental apparatus 1000 during the dental procedure. This configuration ensures that the groove 130 can be used reliably to drain fluid away from the dental apparatus 1000 during a dental procedure.

The reinforcing member components 300A-300D can also have a groove (or U-like shape) along their respective lengths. However, this configuration is non-limiting. The reinforcing member components 300A-300D can also have other shapes, for example, a flat-bar shape or other shape that assists the groove 130 in retaining its shape under pressure while increasing the rigidity of the body 100, as described in this specification.

As illustrated in FIGS. 5, 9 and 10, the dam 700 extends along the through opening 120 of the base 110 and covers the through opening 120. The dam 700 may be a sheet made of a flexible elastomeric material. The flexible elastomeric material of the dam 700 may include, for example, and without limitation, latex, or rubber derived from latex. For patients with sensitivity to latex, the dam 700 may exclude latex, and may include non-latex alternatives such as polypropylene, polyisoprene, nitrile material, etc.

The body 100, the reinforcing member 300 and the dam 700 may exclude bisphenol A (BPA).

As illustrated in FIGS. 5, 9 and 10, the dam 700 may include at least one through opening 720. Each one of the one or more through openings 720 is usable to accommodate a patient's tooth therethrough. For example, the elastomeric dam 700 can be stretched at one of its through opening(s) 720 to increase the size of the through opening 720 to a degree that is sufficient for a tooth of a patient to be fit through the through opening 720. The dam 700 can then be lowered (or raised, depending on which jaw the dam is being used) to approximately the gum line.

Figure 12:
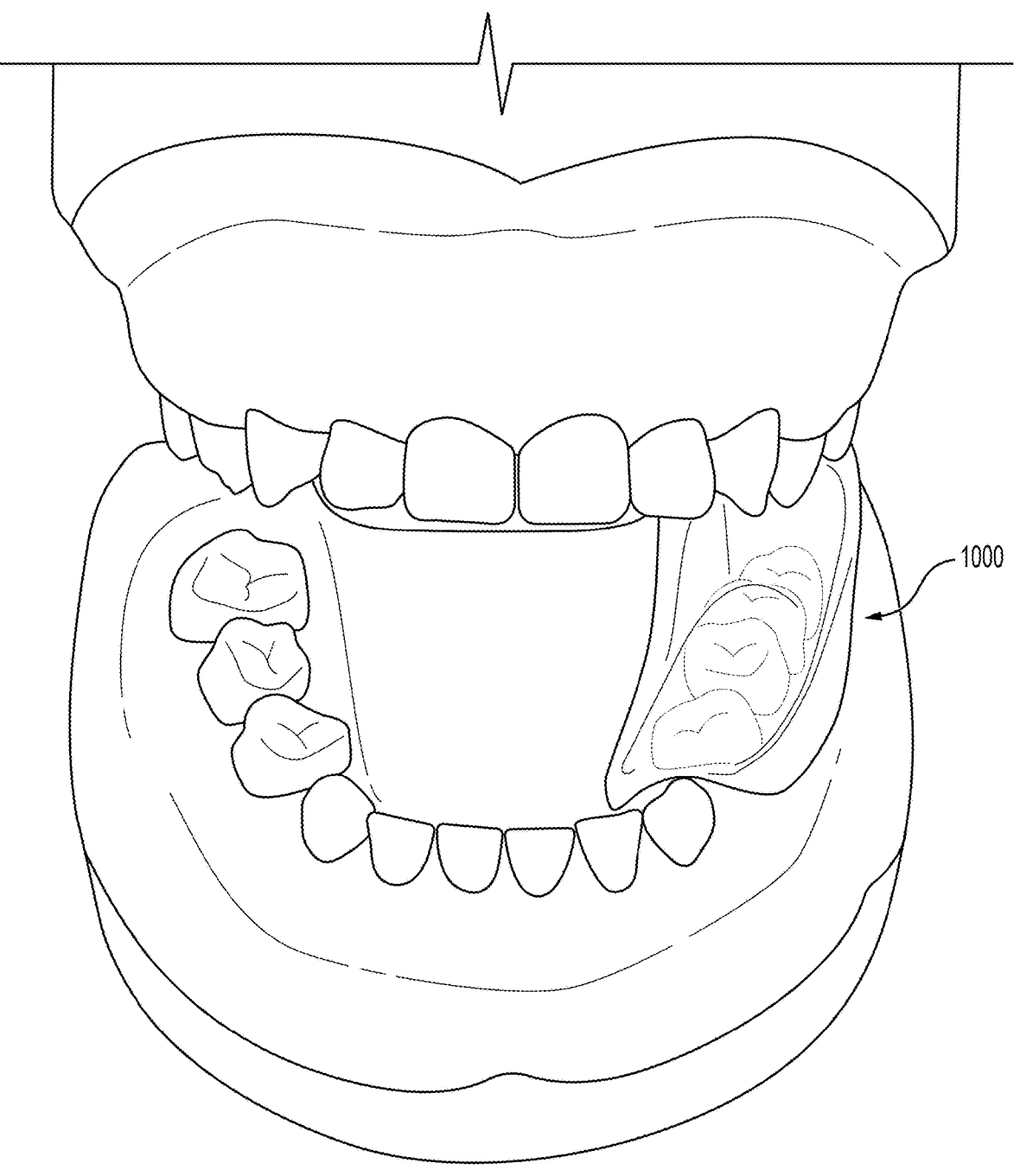
FIG. 12 is a perspective view illustrating the dental apparatus of FIG. 1 disposed between the teeth of the upper jaw and the teeth of the lower jaw of a dental model.

The dental apparatus 1000 described with reference to FIGS. 1-10 can be used for procedures on a tooth located in the lower jaw, left hand side of a patient, as illustrated in FIG. 12. In addition, the dental apparatus 1000 can be used for dental procedures on a tooth located in the upper jaw, right hand side of the patient by reversing the orientation of the apparatus 1000 relative to the orientation thereof illustrated in FIG. 12 (e.g., by turning the apparatus 1000 upside-down).

Figure 11:
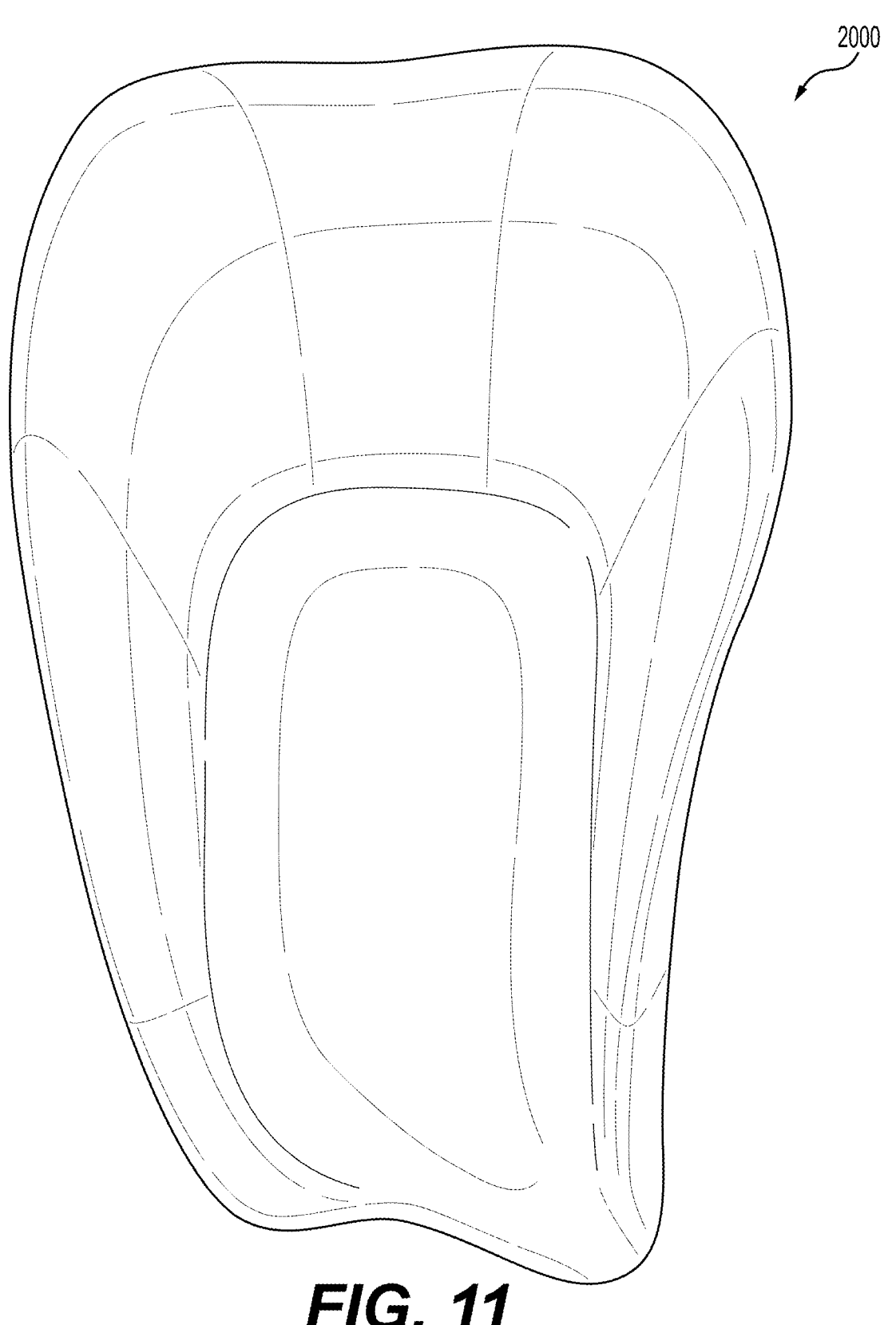
FIG. 11 is a top view illustrating a dental apparatus of the present subject matter.

FIG. 11 illustrates a dental apparatus 2000. The dental apparatus 2000 is constructed in the same manner as the dental apparatus 1000. However, the dental apparatus 2000 has a mirrored structural configuration relative to the dental apparatus 1000. As such, the dental apparatus 2000 can be used for dental procedures on a tooth located in the lower jaw, right hand side of a patient and for dental procedures on a tooth located in the upper jaw, left hand side of a patient.

A method of using a dental apparatus taught by this specification includes obtaining a dental apparatus. For example, the method may include obtaining the dental apparatus 1000 or obtaining the dental apparatus 2000.

The method of using the dental apparatus may include placing the obtained dental apparatus in the mouth of a dental patient, the dental apparatus being positioned in the mouth of the dental patient between teeth in an upper jaw of the patient and teeth in a lower jaw of the patient, with the buccal side of the body of the dental apparatus coinciding with a cheek side of the patient and the lingual side of the body of the dental apparatus coinciding with a lingual side of the patient.

For example, when obtaining and using the dental apparatus 1000, the buccal side 250 of the body 100 will coincide with the cheek side of the patient and the lingual side 270 of the body 100 will coincide with the lingual (or tongue) side of the patient, whether the dental apparatus 1000 is used in the lower jaw, left hand side of the patient, or in the upper jaw, right hand side of the patient.

Since the dental apparatus 2000 is a mirrored version of the dental apparatus 1000, the buccal side of the dental apparatus 2000 will coincide with the cheek side of the patient and the lingual side of the dental apparatus 2000 will coincide with the lingual side of the patient, whether the dental apparatus 1000 is used in the lower jaw, right hand side of the patient, or in the upper jaw, left hand side of the patient.

The method may include fastening a through opening in the dam of the dental apparatus around a tooth of a patient to expose said tooth and to cover other teeth of the patient on a same jaw as the exposed tooth.

The method may also include seating at least a portion of the anterior sidewall of the dental apparatus between a pair of adjacent teeth on the same jaw as the exposed tooth such that the seated portion can be placed on the gum of the patient. This step can secure the front (or anterior side) of the dental apparatus to the patient's teeth.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A dental apparatus, comprising:
a body made of a first elastomeric material; and
a reinforcing member disposed at least partially inside of the body,
wherein the body of the dental apparatus includes:
a base having a first side surface and a second side surface opposite to the first side surface,
wherein a periphery of the first side surface and a periphery of the second side surface define:
a posterior side of the body,
an anterior side of the body, spaced apart from the posterior side;
a buccal side of the body, connecting the anterior side and the posterior side to one another; and
a lingual side of the body, connecting the anterior side and the posterior side to one another, the lingual side being spaced apart from the buccal side;
a first plurality of sidewalls protruding from the first side surface of the base; and
a second plurality of sidewalls protruding from the second side surface of the base, opposite to the first plurality of sidewalls,
wherein the first plurality of sidewalls includes:
a posterior sidewall extending along the posterior side of the body;
an anterior sidewall extending along the anterior side of the body, the anterior sidewall protruding by a lesser distance from the first side surface of the base than the posterior sidewall;
a first buccal sidewall extending along the buccal side of the body; and
a first lingual sidewall extending along the lingual side of the body;
wherein the second plurality of sidewalls includes:
a second buccal sidewall extending along the buccal side of the body; and
a second lingual sidewall extending along the lingual side of the body,
wherein the base of the body includes a through opening, said through opening connecting the first and second side surfaces of the base to one another, the through opening extending between the first plurality of sidewalls and between the second plurality of sidewalls; and
a dam covering the through opening of the base,
wherein the reinforcing member is made of a second elastomeric material, and wherein the second elastomeric material of the second reinforcing member has a greater stiffness than the first elastomeric material of the body of the dental apparatus.

2. The apparatus of claim 1, wherein the reinforcing member includes a plurality of reinforcing member components, said plurality of reinforcing member components being connected to one another and extending all around the through opening of the base.

3. The apparatus of claim 1, wherein the body of the dental apparatus includes silicone.

4. The apparatus of claim 1, wherein the reinforcing member includes polypropylene.

5. The apparatus of claim 1, wherein the base includes a groove on the first side surface of the base, the groove extending between the through opening and the posterior sidewall, between the through opening and the first buccal sidewall, between the through opening and the first lingual sidewall, and between the through opening and the anterior sidewall.

6. The apparatus of claim 5, wherein a depth of the groove increases in a direction toward the anterior sidewall.

7. The apparatus of claim 5, wherein the anterior sidewall includes a gap, wherein the groove is in fluid communication with the gap such that fluid accumulated in the groove can drain through the gap.

8. The apparatus of claim 7, wherein the gap in the anterior sidewall is disposed adjacent to the first lingual sidewall.

9. The apparatus of claim 1, wherein at least a portion of a peripheral edge of the posterior sidewall, distal to the first side surface of the base, is concave.

10. The apparatus of claim 1, wherein at least a portion of a peripheral edge of the anterior sidewall, distal to the first side surface of the base, is concave.

11. The apparatus of claim 10, wherein a peripheral edge of the second side surface of the base, which defines the anterior side of the body, is concave.

12. The apparatus of claim 11, wherein the concave edge of the second side surface of the base is located opposite to the concave edge of the anterior sidewall.

13. The apparatus of claim 1, wherein the dam is made of a flexible elastomeric material, and
the dam includes at least one through opening, said at least one through opening being usable to accommodate a patient's tooth therethrough.

14. The apparatus of claim 1, wherein the second buccal sidewall and the second lingual sidewall form an elongated concave surface therebetween.

15. The apparatus of claim 1, wherein the first buccal sidewall decreases in height in a direction toward the anterior sidewall.

16. The apparatus of claim 1, wherein the first lingual sidewall decreases in height in a direction toward the anterior sidewall.

17. A method of using a dental apparatus, comprising:
obtaining a dental apparatus, the dental apparatus including:
a body made of a first elastomeric material; and
a reinforcing member disposed at least partially inside of the body,
wherein the body of the dental apparatus includes:
a base having a first side surface and a second side surface opposite to the first side surface,
wherein a periphery of the first side surface and a periphery of the second side surface define:
a posterior side of the body, an anterior side of the body, spaced apart from the posterior side;

a buccal side of the body, connecting the anterior side and the posterior side to one another; and a lingual side of the body, connecting the anterior side and the posterior side to one another, the lingual side being spaced apart from the buccal side;

a first plurality of sidewalls protruding from the first side surface of the base; and a second plurality of sidewalls protruding from the second side surface of the base, opposite to the first plurality of sidewalls, wherein the first plurality of sidewalls includes:

a posterior sidewall extending along the posterior side of the body;

an anterior sidewall extending along the anterior side of the body;

a first buccal sidewall extending along the buccal side of the body; and a first lingual sidewall extending along the lingual side of the body;

wherein the second plurality of sidewalls includes:

a second buccal sidewall extending along the buccal side of the body; and a second lingual sidewall extending along the lingual side of the body, wherein the base of the reinforcing body includes a first through opening, said first through opening connecting the first and second side surfaces of the base to one another, the first through opening extending between the first plurality of sidewalls and between the second plurality of sidewalls; and a dam covering the first through opening of the base;

placing the dental apparatus in a mouth of a dental patient, the dental apparatus being positioned in the mouth of the dental patient between teeth in an upper jaw of the patient and teeth in a lower jaw of the patient, with the buccal side of the body of the dental apparatus coinciding with a cheek side of the patient and the lingual side of the body of the dental apparatus coinciding with a lingual side of the patient; and fastening a second through opening in the dam around a tooth of a patient to expose said tooth and cover other teeth of the patient on a same jaw as the exposed tooth.

18. The method of claim 17, further including a step of seating at least a portion of the anterior sidewall between a pair of adjacent teeth on the same jaw as the exposed tooth.

19. The method of claim 18, wherein an edge of the seated anterior sidewall, distal to the first side surface of the base, is concave, and wherein an edge of the second side surface of the base, which defines the anterior side of the body, is concave, and is disposed opposite to the concave edge of the anterior sidewall.

20. A dental apparatus, comprising:

a body made of a first elastomeric material; and a reinforcing member disposed at least partially inside of the body, wherein the body of the dental apparatus includes:

a base having a first side surface and a second side surface opposite to the first side surface, wherein a periphery of the first side surface and a periphery of the second side surface define:

a posterior side of the body, an anterior side of the body, spaced apart from the posterior side;

a buccal side of the body, connecting the anterior side and the posterior side to one another; and a lingual side of the body, connecting the anterior side and the posterior side to one another, the lingual side being spaced apart from the buccal side;

a first plurality of sidewalls protruding from the first side surface of the base; and a second plurality of sidewalls protruding from the second side surface of the base, opposite to the first plurality of sidewalls, wherein the first plurality of sidewalls includes:

a posterior sidewall extending along the posterior side of the body;

an anterior sidewall extending along the anterior side of the body, the anterior sidewall protruding by a lesser distance from the first side surface of the base than the posterior sidewall;

a first buccal sidewall extending along the buccal side of the body; and a first lingual sidewall extending along the lingual side of the body;

wherein the second plurality of sidewalls includes:

a second buccal sidewall extending along the buccal side of the body; and a second lingual sidewall extending along the lingual side of the body, wherein the base of the body includes a through opening, said through opening connecting the first and second side surfaces of the base to one another, the through opening extending between the first plurality of sidewalls and between the second plurality of sidewalls; and a dam covering the through opening of the base, wherein the base includes a groove on the first side surface of the base, the groove extending between the through opening and the posterior sidewall, between the through opening and the first buccal sidewall, between the through opening and the first lingual sidewall, and between the through opening and the anterior sidewall.

* * * * *